United States Patent Office 2,702,287
Patented Feb. 15, 1955

2,702,287
RUBBER TREATMENT

Alfred N. Iknayan, Detroit, Mich., and Lester C. Peterson and Harvey J. Batts, Indianapolis, Ind., assignors to United States Rubber Company, New York, N. Y., a corporation of New Jersey No Drawing. Application May 27, 1952,
Serial No. 290,344

17 Claims. (Cl. 260—38)

This invention relates to novel treatment of Butyl rubber. The term "Butyl rubber" is used herein in its ordinary sense to denote a sulfur-vulcanizable copolymer of a major proportion of isobutylene and a minor proportion of a multi-olefinic unsaturate having from 4 to 14 carbon atoms per molecule, the multi-olefinic unsaturate usually being an aliphatic conjugated diolefin hydrocarbon having from 4 to 6 carbon atoms per molecule, typically isoprene or butadiene, the proportions of combined monomers in the copolymer usually ranging from 90 to 99.5% of isobutylene and correspondingly from 10 to 0.5% of the multi-olefinic unsaturate.

This invention is based upon our discovery that many remarkable advantages are obtained by heating a mixture of raw Butyl rubber and from 0.25 to 2 parts per 100 thereof of a material selected from the group consisting of 4-hydrocarbon-2,6-dimethylolphenols and heat-reactive, oil-soluble, resinous self-condensation products thereof until at least 10% of said Butyl rubber has been rendered benzol-insoluble.

In commercial practice we almost invariably use the resinous self-condensation products of the 4-hydrocarbon-2,6-dimethylolphenols. These self-condensation products are heat-reactive oil-soluble resinous materials soluble in Butyl rubber.

The heat treatment of the mixture of Butyl rubber and the phenolic curative causes the phenolic curative to react with the Butyl rubber in such a manner as to render a portion of the Butyl rubber insoluble in benzol. The heat treatment of our invention greatly enhances the physical properties of the Butyl rubber and converts it to a material which is in certain respects far easier to process, has increased nerve, has reduced plasticity which is reflected in higher numerical values for Mooney viscosity and Williams plasticity number, and has an increased elasticity which is reflected in a higher Williams recovery value. In many respects the treatment of the present invention imparts to the Butyl rubber many of the properties of natural rubber.

Control over the extent of the change in the Butyl rubber brought by means of the present invention is exercised by adjusting the amount of the phenolic curative and the time and temperature of the heat treating step with the result that at least 10% of the hydrocarbon content of the Butyl rubber is converted to benzol-insoluble form.

The present invention is carried out by heating an intimate mixture of the raw Butyl rubber and the phenolic curative at a temperature sufficiently elevated to cause the phenolic curative to react with and partially cure the Butyl rubber as evidenced by the increase in the benzol-insoluble fraction. This partial curing can be termed pre-scorching.

The heat treatment can be effected at temperatures as low as 235° F., provided the heating time is proportionately adjusted to effect the desired change in the Butyl rubber. The treating temperature can range upwardly from 235° F. to the point at which the stock would be injured by thermal decomposition. We prefer to employ a temperature of at least 300° F., say from 300 to 370° F.

The heat treatment can be done under static conditions, for example, by applying extraneous heat to the mixture in an oven. However, we much prefer to effect the heat treatment by masticating the mixture in an internal mixer, especially a Banbury mixer, or on an open rubber mill, and allowing the heat generated by the mixing procedure to raise the temperature of the mixture and thereby accelerate the reaction.

If an open rubber mill is used for performing the heat treatment, we often prefer to heat the rolls thereof so as to cause the temperature of the stock to more rapidly rise to levels within the higher portions of the indicated range. With an internal mixer no extraneous heating or cooling is usually required.

When the heat treatment is carried out by a mastication process in an internal mixer, as in a Banbury mixer, we prefer to allow the temperature to rise to 300° F. or higher since such temperatures greatly speed up the reaction and correspondingly increase the productivity of the equipment.

The change in the Butyl rubber brought about by the phenolic curatives of our invention is permanent to a high degree so that the beneficial effects are not readily "worked out" or destroyed in subsequent factory processing such as incorporation of compounding ingredients by normal factory milling or Banbury mixing.

In practicing our invention, we typically add the 4-hydrocarbon-2,6-dimethylolphenol or the resinous self-condensation product thereof to the raw Butyl rubber in a Banbury mixer and masticate therein for from 5 to 12 minutes at 300-370° F. We can apply our treatment to the Butyl rubber itself or to mixtures thereof with compounding materials such as carbon black, clay, neutral softeners, such as substantially non-volatile hydrocarbon oil, etc. If desired, we can have present during the heat treatment both carbon black and such a softener.

The desired reaction may be retarded by the presence in the Butyl rubber of certain amounts of certain materials which are normally incorporated therein by the manufacturer, these materials being exemplified by certain amines used as stabilizing anti-oxidants, especially phenyl beta-naphthylamine, metallic soaps such as zinc stearate, and free fatty acid such as stearic acid. The retarding action of the specified materials is most pronounced when the amount of the phenolic curative is in the lower portion of the range, e. g., from 0.25 to 1 part per 100 parts of Butyl rubber. We have found that the retarding effect of the specified materials can be compensated by an appropriate increase in the amount of phenolic curative used; for example, when such retarders are present in substantial amounts, we prefer to employ from 1.5 to 2.0 parts of the phenolic curative per 100 parts of Butyl rubber.

There are certain materials which function as stabilizers or anti-oxidants in raw Butyl rubber and which do not interfere to any detectable extent with the reaction of the present invention. An example of such a material is 2,6-ditertiary-butyl-para-cresol, which is present in some types of commercial Butyl rubber. Such materials, of course, need not be taken into consideration.

After the reaction between the Butyl rubber and the phenolic curative has proceeded to the desired extent as evidenced by conversion of at least 10% of the Butyl rubber (i. e., the hydrocarbon content thereof) to the benzol-insoluble form, we can remove the treated material from the Banbury mixer or other equipment in which the reaction was carried out, package it and sell it as an article of commerce. The partially cured Butyl rubber of our invention promises to become a very valuable article of commerce. As previously indicated, it has properties which are far superior to those of ordinary raw Butyl rubber. It processes in a manner which is superior to the raw polymer. It is not sticky, as is the raw Butyl rubber which has to be shipped in a box, usually with a polyethylene liner. Our partially cured Butyl rubber is much easier to handle, pack and ship. The partial curing of our invention can be applied by the Butyl rubber manufacturer in the plant where the Butyl rubber is made; or, the raw Butyl rubber can be purchased from the manufacturer, treated in accordance with our invention and the resulting product sold as an article of manufacture to users. We visualize wide replacement of the raw Butyl rubber of commerce with the partially cured Butyl rubber of our invention.

The benzol-insoluble portion of the treated Butyl rubber is determined by simply extracting a sample with pure benzol at room temperature for 24 hours, drying the sample, and determining the amount of insoluble material. The benzol-insoluble hydrocarbon portion of the treated Butyl rubber is determined by correcting the value thus obtained to account for the amount of carbon black or other benzol-insoluble material present with the Butyl rubber during the treatment.

The partially cured Butyl rubber of our invention has a remarkable tolerance for large amounts of hydrocarbon oil. We usually incorporate at least 25 parts of a substantially nonvolatile hydrocarbon oil per 100 parts of Butyl rubber. (All figures given herein for the amounts of materials blended with the treated Butyl rubber of our invention are based on 100 parts of original raw Butyl polymer.) Whereas with ordinary Butyl rubber it is difficult to incorporate more than 25 parts of non-volatile hydrocarbon oil without getting a mixture that is too soft to process, our partially cured Butyl rubber will easily tolerate 35 to 90 parts of such oil and still give firm easily processable mixtures. Those mixtures of our invention which contain 40 or more parts of the oil are particularly advantageous. A marked advantage of the mixtures of our invention which contain 40 to 90 parts of oil is that they are solid resilient materials which lend themselves to ready handling in the same manner as ordinary raw Butyl rubber, raw natural rubber or the like. Thus our invention makes feasible the high loading of Butyl rubber with oil, which has not heretofore been commercially possible.

In practicing our invention we particularly prefer to employ from 50 to 90 parts of the substantially non-volatile hydrocarbon oil.

An inner tube made by sulfur vulcanization of Butyl rubber which has been partially cured in accordance with our invention and which contains from 50 to 90 parts, for example from 60 to 75 parts, of substantially non-volatile hydrocarbon oil per 100 of Butyl rubber is resistant to cold and, even at temperatures as low as −30° F. and even when run under-inflated, does not exhibit the undesirable and commonly known property of "cold buckling" which has presented such a problem in the Butyl rubber inner tube field.

Any substantially non-volatile oil commonly used in rubber compounding and compatible with Butyl rubber can be used in practicing our invention. We much prefer to use the hydrocarbon oils, examples of suitable hydrocarbon oils being shown in Lightbown et al. U. S. Patent 2,392,855.

Part or all of the oil can be present during the heat treatment of our invention. Likewise, part or all of the filler to be used, such as carbon black, can be present during the heat treatment.

It was unexpected to find that the reaction of the Butyl rubber with the phenolic curative in accordance with our invention greatly improves the oil tolerance despite the conversion of part of the Butyl rubber to benzol-insoluble form.

The partially cured Butyl rubber of our invention, whether extended with carbon black or with oil or with both, can be sold as an article of commerce, as well as the unextended heat-treated mixture.

After completion of the heat treatment, the heat-treated mixture is compounded with the normal amounts of sulfur, accelerators, anti-oxidants, filler, softener, zinc oxide, stearic acid, and other compounding ingredients. The sulfur and accelerators should be incorporated in the usual manner at relatively low temperatures, typically below 235° F., in order to prevent premature reaction thereof with the vulcanizable heat-treated Butyl rubber. The mixture is then shaped, for example, by extrusion in the case of inner tubes, and the shaped articles are then vulcanized in the conventional manner.

In practicing our invention, the heat treatment is preferably so performed, i. e., the amount of phenolic curative is so limited and the heat treatment is sufficiently prolonged, that the reactivity of the curative is completely or nearly completely exhausted. The reaction is preferably carried to a point such that the amount of unreacted phenolic curative remaining is so small as not appreciably to interfere with the subsequent sulfur curing, i. e., vulcanization. If substantial amounts of unreacted phenolic curative were to remain they would objectionably retard the subsequent vulcanizing reaction and consequently they are to be avoided.

As the phenolic curative used in practicing our invention, we can use any 4-hydrocarbon-2,6-dimethylolphenol or oil-soluble, heat-reactive self-condensation product thereof. Such phenolic curatives can be made in any manner well known to those skilled in the art. Typically they are made by reacting a para-hydrocarbon-substituted phenol having the two ortho positions unoccupied with a considerable molar excess of formaldehyde, the mol ratio of formaldehyde to phenol typically being 2:1, in the presence of a strong alkaline catalyst, especially an alkali metal hydroxide, which is subsequently neutralized. The mixture of the phenol, formaldehyde and alkaline catalyst is heated at a suitable temperature, e. g., 25–100° C., the first stage of the reaction involving formation of the phenol methylol, i. e., the para-substituted-2,6-dimethylolphenol. This phenol dialcohol can be isolated by acidification of the mixture and separation of the oily layer which can then be advanced to higher molecular weight form by heating at say 75–175° C. This higher molecular weight form is oil-soluble and heat-reactive, and has the advantage that it is more reactive with the Butyl rubber than the lower molecular weight form. Separation of the phenol dialcohol can be omitted, in which case the reaction is carried past the monomer stage to the resinous stage, whereupon the mixture is neutralized and water is removed to give the resinous material. In any case care should be taken to stop while the resin is in the soluble (in conventional organic solvents and drying oils) and fusible state.

The phenolic resins used in the practice of our invention are of the resol type. They are sharply distinguished from the novolac type of phenolic resins by the fact that they contain methylol groups at the chain terminals. The novolac type of resin is made under acid conditions, is free from these essential methylol groups, is not heat-reactive, and will not react with Butyl rubber to give the results achieved by our invention.

Although the monomeric para-hydrocarbon-substituted phenol dialcohols themselves can be used in the practice of our invention, we much prefer to employ the self-condensation resins since these give faster curing and a higher degree of cure for a given amount of curative and are much easier to handle in the factory than the primary reaction products (the dialcohols).

The phenol from which the phenolic curative is made can have any hydrocarbon group in the position para to the phenolic hydroxyl, examples being alkyl groups, especially alkyl groups having from 3 to 20 carbon atoms, tertiary-butyl and tertiary-octyl (alpha, alpha, gamma, gamma-tetramethylbutyl) being especially preferred, cycloalkyl groups, aryl groups such as phenyl, and aralkyl groups such as benzyl and cumyl. We believe that the tertiary butyl and the aforementioned branched octyl are outstanding. The meta- and ortho-alkyl phenols do not give the results of our invention.

The loading with fillers such as carbon black can vary widely. When oil loading and carbon black loading are used, the carbon black loading can vary with the degree of the oil loading. For example, at oil loadings of 60 to 75 parts in inner tube stocks, we prefer to use carbon black loadings of from 75 to 90 parts.

Generally speaking, the amount of carbon black used in the practice of our invention can vary widely, for example from 10 to 200 parts depending upon many factors including end use, type of carbon black, etc.

Instead of carbon black, we can use any other suitable filler, examples being clay, calcium carbonate, precipitated hydrated silica, precipitated hydrated calcium silicate, etc.

In addition to its high tolerance for oil, the partially cured Butyl rubber of the present invention exhibits many other valuable advantages. Thus it shows extremely high resistance to "fold breakdown," by which is meant that unvulcanized stocks, especially inner tube stocks, made therewith do not exhibit failure from creasing; this is in marked contrast to ordinary stocks. Thus, a raw inner tube made of ordinary Butyl stock and left in flat condition around the plant for some time before curing often develops cracks and areas of weakness along the creases. In addition, the partially cured Butyl rubber of our invention is not readily damaged by the creasing and pressing which take place in the inner tube splicing operation whereas ordinary sulfur-compounded Butyl rubber stocks, and particularly those containing sufficient hydrocarbon oil to give protection against cold buckling, are subject to frequent damage during splicing, particularly in hot weather.

In addition, stocks made from the partially cured Butyl rubber of the present invention, with or without admixture with oil, exhibit a lower torsional hysteresis than conventional Butyl rubber stocks. The lower hysteresis is particularly noticeable when part of the carbon black is present during the preliminary or partial curing reaction of our invention.

The present invention, by enabling the incorporation of extremely large quantities of oil without converting the Butyl rubber into an unusable, difficult-to-handle material, correspondingly extends the available Butyl rubber supply. The properties of the oil-extended partially cured Butyl rubber of the present invention are not adversely affected. In addition, the present invention enables the incorporation of an increased amount of filler, such as carbon black, without impairing the physical properties of the Butyl rubber, this also correspondingly extending the supply of Butyl rubber.

The following examples illustrate our invention in more detail. All parts expressed herein are by weight.

Example 1

Inner tubes were made by the present invention from the following formulation:

| | Parts |
|---|---|
| Butyl (GR-I 18) | 100.00 |
| Amberol ST-137 resin [1] | .75 |
| Mercaptobenzothiazole | 1.00 |
| Tetramethyl thiuramdisulfide | 1.50 |
| Stearic acid | 1.00 |
| Zinc oxide | 3.00 |
| SRF carbon black | 50.00 |
| EPC carbon black | 30.00 |
| Mineral oil (viscosity 160-180 Saybolt at 100° F.) | 50.00 |
| Sulfur | 2.00 |
| | 239.25 |

[1] A heat-reactive, oil-soluble, alkaline-catalyzed p-octylphenol-formaldehyde resin.

The Butyl, EPC black and resin were charged to a Banbury and mixed therein, the temperature gradually rising to 330° F. at 7.5 minutes. Then 10 parts of the oil were added and mixing was continued. At an elapsed time of 14 minutes the temperature had reached 365° F. and pre-scorching, which had actually started before 300° F. had been reached, was then substantially complete. The Banbury was then discharged and the stock permitted to cool. The benzol-insoluble portion of the mixture at this point was 41.8%. The batch weight of 140.75 parts contained 30 parts of carbon black. Dividing 30 by 140.75 gives 21.4% of carbon black. Subtracting this from 41.8 gives 20.4% of insoluble hydrocarbon on the total mix. The percentage of Butyl rubber in the original batch was 71.2%. Dividing 20.4 by 71.2 gives 28.7% of the Butyl hydrocarbon which had been converted to benzol-insoluble form.

A proper amount by volume, selected with reference to the capacity of the Banbury, was then re-charged to the Banbury together with the SRF black, zinc oxide, stearic acid and the balance of the oil, which were employed in such proportions as to comply with the above formulation, and mixing was resumed. After 15 minutes the temperature had reached 265° F. at which point mixing was complete. The Banbury was then discharged. The stock was then mixed with the sulfur and accelerators, using proportions as indicated above, on an open rubber mill. The mixture was then converted into inner tubes by the conventional method including extruding, splicing and vulcanizing. The resulting inner tubes had the following physical properties.

| | |
|---|---|
| Curing time, minutes at 360° F. | 5 |
| Tensile, p. s. i. | 1480 |
| Elongation, percent | 740 |
| Modulus, 300% | 375 |
| Modulus, 500% | 805 |
| Set (ASTM) | 18 |
| Hardness (Shore A) | 42 |
| Torsional hysteresis at 100° F. | 0.184 |

The low torsional hysteresis is noteworthy and is to be compared with a torsional hysteresis value (at 100° F.) of 0.245 for a conventional Butyl inner tube. The low torsional hysteresis brought about by the practice of our invention is due to the prescorching reaction with the resin and not to the high oil content.

Example 2

In this example three lots of Butyl rubber were treated in a factory Banbury mixer. In both examples 2A and 2B and 20 parts of carbon black (per 100 parts of Butyl rubber) were present during the treatment. Example 2B differed from Example 2A in that 1 part of the commercial phenolic resin, "Amberol ST-137," was present during the treatment which effected reaction of the resin with the Butyl rubber. Example 2C differed in that the carbon black was absent and the resin amount was 0.75 part.

The formulations, Banbury mixing conditions and properties of the resulting base stocks were:

| | Example 2A | Example 2B | Example 2C |
|---|---|---|---|
| Butyl (GR-I 18) | 100.00 | 100.00 | 100.00 |
| Fast-extruding Furnace Carbon Black | 20.00 | 20.00 | |
| "Amberol ST-137" | | 1.00 | 0.75 |
| Batch Time (minutes) | 9.75 | 10.00 | 13.00 |
| Maximum Temp. (° F.) | 370 | 355 | 350 |
| Percent of Butyl hydrocarbon which had been converted to benzol-insoluble form | 4.0 | 31.0 | 13.0 |

The resulting base stocks were then compounded in the Banbury mixer with more carbon black and with softener, zinc oxide and stearic acid. The proportions and conditions were:

| | Example 2A | Example 2B | Example 2C |
|---|---|---|---|
| Base Stock (above) | 120.00 | 121.00 | 100.75 |
| Fast-extruding Furnace Carbon Black | 10.00 | 10.00 | 30.00 |
| Carbon black (semi-reinforcing furnace type) | 50.00 | 50.00 | 50.00 |
| Mineral Oil (Viscosity 160-180 Saybolt at 100° F.) | 50.00 | 50.00 | 50.00 |
| Zinc Oxide | 3.00 | 3.00 | 3.00 |
| Stearic Acid | 1.00 | 1.00 | 1.00 |
| Batch Time (Min.) | 16.0 | 11.00 | 9.00 |
| Maximum Temp. (° F.) | 230 | 255 | 300 |

The resulting stocks were then sulfured on the open mill. The formulations were:

| | Example 2A | Example 2B | Example 2C |
|---|---|---|---|
| Base Stock (as just given) | 234.00 | 235.00 | 233.75 |
| Mercaptobenzothiazole | 1.00 | 1.00 | 1.00 |
| Tetramethyl Thiuramdisulfide | 1.50 | 1.50 | 1.50 |
| Sulfur | 2.00 | 2.00 | 2.00 |

Sulfured stock 2A had extremely poor fold breakdown resistance while sulfured stocks 2B and 2C were extremely satisfactory in this respect.

The sulfured stocks were then cured at 350° F. The properties of the vulcanizates were:

| | Example 2A | Example 2B | Example 2C |
|---|---|---|---|
| Cured 3½' at 350°: | | | |
| Tensile | 1,265 | 1,320 | 1,335 |
| Elongation at Break | 830 | 680 | 810 |
| 300% Modulus | 205 | 415 | 310 |
| 500% Modulus | 490 | 840 | 600 |
| Hardness | 44 | 38 | 37 |
| Perm. Set | 22 | 23 | 20 |
| Cured 5' at 350°: | | | |
| Tensile | 1,290 | 1,355 | 1,385 |
| Elongation at Break | 780 | 680 | 780 |
| 300% Modulus | 280 | 440 | 360 |
| 500% Modulus | 560 | 855 | 665 |
| Hardness | 47 | 40 | 40 |
| Set | 28 | 28 | 23 |
| Acetone Extract | 23.41 | 23.09 | 23.14 |
| Tor. Hyst. (100°) | .263 | .217 | .190 |
| Cured 10' at 350°: | | | |
| Tensile | 1,130 | 1,235 | 1,230 |
| Elongation at Break | 640 | 570 | 650 |
| 300% Modulus | 440 | 590 | 495 |
| 500% Modulus | 785 | 1,050 | 850 |
| Hardness | 49 | 43 | 43 |
| Set | 34 | 34 | 29 |

Example 3

Butyl rubber (GR-I 18) was partially cured with a variety of oil-soluble, heat-reactive phenol-formaldehyde resins made from phenols substituted with hydrocarbon radicals in the position para to the hydroxyl. A control consisting of the Butyl rubber only, i. e., without any other material present, was treated in an identical manner.

In the resin-containing batches 2 parts of the phenolic resin specified in the following table were mixed with 100 parts of the raw Butyl rubber. After apparent dispersion of the resin in the rubber the stocks were milled for two minutes at 200° F. to form a uniform homogeneous mixture. The stocks were then heated in an air oven at 300° F. for 90 minutes; this effected reaction in the case of the resin-containing stocks.

The stocks were allowed to cool whereupon the benzol-insoluble content of each was determined.

The data were as follows:

| Batch No. | Phenolic Resin | Benzol-Insoluble Portion After Reaction |
|---|---|---|
| 1 | None (Control) | .03 |
| 2 | p-Octylphenol-CH₂O (Note 1) | >10 |
| 3 | "Amberol ST-137" (Note 2) | >10 |
| 4 | "Bakelite BR 14634" (Note 3) | >10 |
| 5 | p-Tert. Butylphenol-CH₂O (Note 1) | >10 |
| 6 | "Bakelite BR 10282" (Note 3) | >10 |
| 7 | Novolak (Note 4) | <5 |
| 8 | Special Novolak (Note 5) | <5 |

NOTE 1.—Made by reacting a mixture of one mol of p-tertiary octyl or p-tertiary butyl phenol and slightly more than two mols of formaldehyde in the presence of one mol of sodium hydroxide at 25–70° C., acidifying the reaction mixture, separating the oily layer and converting the latter to an oil-soluble heat-reactive resin by continued heating.
NOTE 2.—Commercial resin made by reacting one mol of p-octyl phenol with 2 mols of formaldehyde under strongly alkaline conditions, no effort being made to isolate the monomer, the resin-containing mixture being neutralized and sparged.
NOTE 3.—Commercial oil-soluble heat-reactive phenol-formaldehyde resin based on p-tertiary butyl phenol.
NOTE 4.—A commercial acid-condensed phenol-formaldehyde resin which will not react with Butyl rubber.
NOTE 5.—Made by reacting one mol of 2,6-dimethylol-p-tert. butylphenol and two mols p-tert. butylphenol under acid conditions to form an oil-soluble Novolac type resin which will not react with Butyl rubber.

Stocks 2 to 6 were deemed outstanding. Control Stock 1 and comparative Stocks 7 and 8 were unsatisfactory.

Example 4

Butyl rubber (GR-I-15) was reacted with "Amberol ST-137" in the presence of a small amount of substantially non-volatile hydrocarbon oil and in the presence and absence of carbon black. There were prepared the following three formulations which were heated and masticated in a size B Banbury (rotating at 50 R. P. M.) for 20 minutes at 350° F.

| | Example 4A | Example 4B | Example 4C |
|---|---|---|---|
| Butyl Rubber (GR-I-15) | 100 | 100 | 100 |
| "Spheron 6" (medium processing channel black) | | 50 | |
| #8 Oil (substantially non-volatile petroleum hydrocarbon oil) | 10 | 10 | 10 |
| "Amberol ST-137" | 1.5 | 1.5 | |

Examples 4A and 4B give a direct comparison of the effect of the presence or absence of carbon black during the prescorching while Example 4C is a blank in which no phenolic curative was used, all of the carbon black being added after the masticatory heat treatment at 350° F. in Examples 4A and 4C.

In Examples 4A and 4B the masticatory heat treatment had converted over 10 per cent of the Butyl rubber to benzol-insoluble form. Less than 10 per cent of the Butyl rubber was converted to benzol-insoluble form by the treatment of Example 4C.

The Mooney viscosities of the resulting mixtures were then determined with the following results:

| | Example 4A | Example 4B | Example 4C |
|---|---|---|---|
| Mooney Viscosity (Large Rotor, 4' at 212° F.) | 65 | 55 | 32 |

The resulting mixtures were then compounded at a temperature below 235° F. with additional compounding ingredients shown in the following table:

| | Example 4A | Example 4B | Example 4C |
|---|---|---|---|
| Above Reaction Mixture | 111.5 | 161.5 | 110 |
| "Spheron 6" | 50 | | 50 |
| Stearic Acid | 1 | 1 | 1 |
| ZnO | 1 | 1 | 1 |
| Tetramethyl thiuram disulfide | 1 | 1 | 1 |
| Benzothiazyl Disulfide | 1 | 1 | 1 |
| Sulfur | 2 | 2 | 2 |

The Mooney viscosities of the resulting mixtures were as follows:

| | Example 4A | Example 4B | Example 4C |
|---|---|---|---|
| Mooney Viscosity (Large Rotor 4' at 212° F) | 79 | 49 | 55 |

The resulting mixtures were then cured at the temperature corresponding to steam under a pressure of 50 pounds per square inch and the physical properties of the vulcanizates were determined with the following results:

| | Time of Cure, Minutes | Example 4A | Example 4B | Example 4C |
|---|---|---|---|---|
| Tensile, p. s. i | 45 | 2,180 | 2,410 | 2,080 |
| | 60 | 2,110 | 2,390 | 2,210 |
| | 75 | 2,050 | 2,440 | 2,290 |
| Elongation | 45 | 540 | 580 | 640 |
| | 60 | 510 | 540 | 630 |
| | 75 | 470 | 530 | 620 |
| M300 (Modulus) | 45 | 1,000 | 880 | 550 |
| | 60 | 1,000 | 990 | 650 |
| | 75 | 1,080 | 1,050 | 680 |
| Log Resistivity | 45 | 6.9 | 8.6 | 5.0 |
| | 60 | 6.8 | 8.1 | 4.9 |
| | 75 | 6.8 | 8.1 | 5.0 |
| Tor. Hyst. 280° F | 45 | .21 | .16 | .34 |
| | 60 | .21 | .16 | .34 |
| | 75 | .21 | .16 | .34 |

The method of measuring the benzol-insoluble content of the treated Butyl rubber in the above examples was as follows: The sample is cut into thin strips about 5 mms. long and less than 1 mm. in thickness. About .30 of a gram of the sample is weighed carefully and placed in a Baker cell equipped with 200 mesh stainless steel screen and containing approximately 75 ccs. of pure benzol. The cell is stoppered and placed in the dark for 24 hours at 75° F. At the end of 24 hours, the excess solvent and dissolved Butyl rubber is drawn off. The residue is dried and weighed to determine the benzol-insoluble content. When benzol-insoluble materials such as fillers are present, allowance is made when computing the benzol-insoluble Butyl.

$$\text{Benzol-insoluble Butyl} = \frac{\text{Weight dry residue}}{\text{Weight sample}} \times 100$$

When insoluble filler is present:

Benzol-insoluble Butyl =

$$\frac{(\text{Dry residue percent} - \text{percent insoluble filler})}{\text{Percent Butyl in compound}} \times 100$$

The Baker cell is well-known in the rubber industry, being used in the standard method for determining benzol-insoluble material in rubber samples. A certain amount of benzol-insoluble material is found by the foregoing method when carbon black is milled with Butyl rubber at high temperature, even in the absence of a phenolic curative. This material is commonly referred to as bound rubber.

In practicing our invention, we especially prefer to carry out the reaction of the Butyl rubber with the phenolic curative by masticating the Butyl rubber with the phenolic curative in the presence of at least a substantial proportion of the carbon black, preferably in amount equal to at least 20 parts of carbon black per 100 parts of Butyl rubber, as exemplified in Examples 1, 2B and 4B. This has the advantage that the resulting mixture exhibits, upon vulcanization, a substantially lower torsional hysteresis and substantially higher electrical resistivity and substantially higher abrasion resistance than would be the case were the heat treatment carried out in the absence of the black and the same amount of black were to be subsequently incorporated in the normal way.

For certain practical reasons we may prefer to add a portion of the hydrocarbon oil during the early stages of the processing as exemplified in Examples 1 and 4.

This application is a continuation-in-part of our co-pending application Serial No. 266,248, filed January 12, 1952, now abandoned.

Having thus described our invention, what we claim and desire to protect by Letters Patent is:

1. As a new composition of matter, a pre-scorched mixture of a rubbery copolymer of isobutylene and from 0.5 to 10% of a conjugated $C_4$ to $C_6$ diolefin and a material selected from the group consisting of 4-hydrocarbon-2,6-dimethylolphenols and heat-reactive oil-soluble self-condensation products thereof in amount equal to from 0.25 to 2 parts per 100 parts of said copolymer, the curing action of said material upon said copolymer being substantially completely exhausted.

2. The method which comprises intimately admixing a rubbery copolymer of isobutylene and from 0.5 to 10% of a conjugated $C_4$ to $C_6$ diolefin with a material selected from the group consisting of 4-hydrocarbon-2,6-dimethylolphenols and heat-reactive oil-soluble self-condensation products thereof in amount equal to from 0.25 to 2 parts per 100 parts of said copolymer, and pre-scorching the mixture by heating it at an elevated temperature until the curing action of said material upon said copolymer has been substantially completely exhausted.

3. The method which comprises intimately admixing a rubbery copolymer of isobutylene and from 0.5 to 10% of a conjugated $C_4$ to $C_6$ diolefin with a material selected from the group consisting of 4-hydrocarbon-2,6-dimethylolphenols and heat-reactive oil-soluble self-condensation products thereof in amount equal to from 0.25 to 2 parts per 100 parts of said copolymer, and pre-scorching the mixture by masticating it at a temperature of at least 300° F. until the curing action of said material upon said copolymer has been substantially completely exhausted.

4. As a new composition of matter, a sulfur-vulcanized pre-scorched mixture of a rubbery copolymer of isobutylene and from 0.5 to 10% of a conjugated $C_4$ to $C_6$ diolefin and a material selected from the group consisting of 4-hydrocarbon, 2,6-dimethylolphenols and heat-reactive oil-soluble self-condensation products thereof in amount equal to from 0.25 to 2 parts per 100 parts of said copolymer, said mixture having been pre-scorched prior to incorporation of sulfur and vulcanization therewith, the curing action of said material upon said copolymer being substantially completely exhausted during the pre-scorching.

5. The method which comprises intimately admixing a rubbery copolymer of isobutylene and from 0.5 to 10% of a conjugated $C_4$ to $C_6$ diolefin with a material selected from the group consisting of 4-hydrocarbon-2,6-dimethylolphenols and heat-reactive oil-soluble self-condensation products thereof in amount equal to from 0.25 to 2 parts per 100 parts of said copolymer, pre-scorching the mixture by heating it at an elevated temperature until the curing action of said material upon said copolymer has been substantially completely exhausted, admixing the thus pre-scorched mixture with sulfur in amount sufficient to completely cure said copolymer, and vulcanizing the resulting mixture.

6. A composition of matter as defined in claim 1 wherein said material is a heat-reactive oil-soluble 4-alkyl phenol-formaldehyde resin in which the alkyl group in the 4-position in the phenol contains from 3 to 20 carbon atoms.

7. A composition of matter as defined in claim 1 wherein said material is a heat-reactive oil-soluble p-tertiary butyl phenol-formaldehyde resin.

8. A composition of matter as defined in claim 1 wherein said material is a heat-reactive oil-soluble alpha,-alpha,gamma,gamma-tetramethylbutyl phenol - formaldehyde resin.

9. As a new composition of matter, the mixture resulting from the mastication at a temperature of at least 300° F. of a mixture of a rubbery copolymer of isobutylene and from 0.5 to 10% of a conjugated $C_4$ to $C_6$ diolefin, carbon black in amount equal to at least 20 parts per 100 parts of said copolymer, and a heat-reactive oil-soluble 4-hydrocarbon substituted phenol-formaldehyde resin in amount equal to from 0.25 to 2 parts per 100 parts of said copolymer until the curing action of said resin upon said copolymer has been substantially completely exhausted, a sulfur vulcanizate of said mixture exhibiting substantially lower torsional hysteresis and substantially higher electrical resistivity than a vulcanizate identical therewith except that said carbon black was absent during said mastication and was added thereafter and prior to vulcanization.

10. As a new composition of matter, a vulcanizate of the mixture defined in claim 9.

11. The method which comprises heating an intimate mixture of a rubbery copolymer of isobutylene and from 0.5 to 10% of a conjugated $C_4$ to $C_6$ diolefin, carbon black in amount equal to at least 20 parts per 100 parts of said copolymer, and a material selected from the group consisting of 4-hydrocarbon-2,6-dimethylolphenols and heat-reactive oil-soluble self-condensation products thereof in amount equal to from 0.25 to 2 parts per 100 parts of said copolymer at a temperature of at least 235° F. until the curing action of said material upon said copolymer is substantially completely exhausted.

12. The method which comprises masticating an intimate mixture of a rubbery copolymer of isobutylene and from 0.5 to 10% of a conjugated $C_4$ to $C_6$ diolefin, carbon black in amount equal to at least 20 parts per 100 parts of said copolymer and a heat-reactive oil-soluble 4-hydrocarbon substituted phenol-formaldehyde resin in amount equal to from 0.25 to 2 parts per 100 parts of said copolymer at a temperature of at least 300° F. until the curing action of said resin upon said copolymer is substantially completely exhausted.

13. As a new composition of matter, a pre-scorched mixture of a rubbery copolymer of isobutylene and from 0.5% to 10% of a conjugated $C_4$ to $C_6$ diolefin and a heat-reactive oil-soluble alkylphenol-formaldehyde resin in amount equal to from 0.25 to 2 parts per 100 parts of said copolymer.

14. The method which comprises intimately admixing a rubbery copolymer of isobutylene and from 0.5% to 10% of a conjugated $C_4$ to $C_6$ diolefin with a heat-reactive oil-soluble alkylphenol-formaldehyde resin in amount equal to from 0.25 to 2 parts per 100 parts of said copolymer, and pre-scorching the mixture by heating it at an elevated temperature until the curing action of said resin has been completed.

15. The method which comprises intimately admixing a rubbery copolymer of isobutylene and from 0.5% to 10% of a conjugated $C_4$ to $C_6$ diolefin with a heat-reactive oil-soluble alkylphenol-formaldehyde resin in amount equal to from 0.25 to 2 parts per 100 parts of said copolymer, and pre-scorching the mixture by masticating it at a temperature of at least 300° F. until the curing action of said resin has been completed.

16. As a new composition of matter, a sulfur-vulcanized pre-scorched mixture of a rubbery copolymer of isobutylene and from 0.5% to 10% of a conjugated $C_4$ to $C_6$ diolefin and a heat-reactive oil-soluble alkylphenol-formaldehyde resin in amount equal to from 0.25 to 2 parts per 100 parts of said copolymer, said mixture having been pre-scorched prior to incorporation of sulfur and vulcanization therewith.

17. The method which comprises intimately admixing a rubbery copolymer of isobutylene and from 0.5% to 10% of a conjugated $C_4$ to $C_6$ diolefin with a heat-reactive oil-soluble alkylphenol-formaldehyde resin in amount equal to from 0.25 to 2 parts per 100 parts of said copolymer, pre-scorching the mixture by heating it at an elevated temperature until the curing action of said resin has been completed, admixing the thus pre-scorched mixture with sulfur in amount sufficient to completely cure said copolymer, and vulcanizing the resulting mixture.

References Cited in the file of this patent

UNITED STATES PATENTS

| | | |
|---|---|---|
| 2,211,048 | Bitterich | Aug. 3, 1940 |
| 2,536,136 | Lucid | Jan. 2, 1951 |

FOREIGN PATENTS

| | | |
|---|---|---|
| 649,975 | Great Britain | Feb. 7, 1951 |